United States Patent
Alzner et al.

(10) Patent No.: US 6,827,214 B2
(45) Date of Patent: Dec. 7, 2004

(54) BARRIER ENVELOPE FOR REUSABLE PHOTO-STIMULABLE PHOSPHOR IMAGING PLATES

(75) Inventors: Edgar Alzner, Garden City, NY (US); Tom Lloyd, New Hyde Park, NY (US)

(73) Assignee: Air Techniques, Inc., Hicksville, NY (US)

( * ) Notice: Subject to any disclaimer, the term of this patent is extended or adjusted under 35 U.S.C. 154(b) by 82 days.

(21) Appl. No.: 10/355,594

(22) Filed: Jan. 31, 2003

(65) Prior Publication Data

US 2003/0147503 A1 Aug. 7, 2003

Related U.S. Application Data

(60) Provisional application No. 60/355,623, filed on Feb. 6, 2002.

(51) Int. Cl.[7] ............................................. B65D 85/30
(52) U.S. Cl. ................................... 206/455; 383/200
(58) Field of Search ........................... 206/454, 455, 206/484; 383/200; 378/175

(56) References Cited

U.S. PATENT DOCUMENTS 3,189,174 A * 6/1965 Cormack .................. 206/63.3
5,239,805 A * 8/1993 Uchida et al. .............. 53/412
5,251,755 A * 10/1993 Kausch ..................... 206/455
5,477,310 A * 12/1995 Lamb et al. ................ 355/72
6,216,870 B1 * 4/2001 Welp ....................... 206/454
6,468,611 B1 * 10/2002 Haskin ..................... 428/35.2

FOREIGN PATENT DOCUMENTS

JP        02003072773 A   *  3/2003

* cited by examiner

*Primary Examiner*—Jacob K. Ackun, Jr.
(74) *Attorney, Agent, or Firm*—Clifford G. Frayne; Louis E. Marn

(57) ABSTRACT

A barrier envelope for reusable photo-stimulable phosphor imaging plates, particularly for digital dental imaging comprised of a plastic transparent film and a plastic opaque film sealed to each other about three sides thereof defining a chamber for an imaging plate and wherein a free side of each film is formed with a flap and one flap is coated with an adhesive medium protected by a peel strip and wherein a "Y" shaped notch is provided on a side of the barrier envelope adjacent to the free side of each film the barrier envelope to facilitate tearing open of the barrier envelope in a removal procedure and transport of an exposed imaging plate to an optical scanning assembly.

8 Claims, 1 Drawing Sheet

BARRIER ENVELOPE FOR REUSABLE PHOTO-STIMULABLE PHOSPHOR IMAGING PLATES

RELATED APPLICATIONS

Applicant claims the benefit of provisional application 60/355,623 filed Feb. 6, 2002.

BACKGROUND OF THE INVENTION

1. Field of the Invention

The present invention relates to barrier envelopes, and more particularly to a barrier envelope for reusable photo-stimulable phosphor imaging plates.

2. Description of the Prior Art

Modern digital dental imaging systems utilize reusable photo-stimulable phosphor (PSP) imaging plates compared to traditional x-ray film. The photo-stimulable phosphor imaging plate enclosed within a barrier envelope is positioned within a patient's oral cavity for subsequent exposure to radiation. After exposure, the encapsulated imaging plate is removed from the oral cavity and the barrier envelope is opened, the exposed imaging plate is removed from the barrier envelope in a light proof chamber for transport to a scanner to be digitally read with the imaging results stored in a central processing unit.

The patient must be protected against cross contamination and toxicity of the imaging plate wherein the imaging plate must be protected from saliva and other substances found in the patient's mouth as well as protection from light until read. At present, barrier envelopes are generally rectangularly-shaped in various sizes to accommodate photo-stimulable phosphor imaging plates common to the dental arts, generally referred to as sizes 0 to 4. The rectangularly-shaped barrier envelope is formed of a plastic partially opaque film and a plastic transparent film sealed together about three sides defining a chamber for an imaging plate with an adhesively coated flap and cooperating flap about either a long or short dimension thereof with the adhesively coated flap formed with a peel-strip. A "V" notch is formed on one side or both flaps to facilitate tearing and removal of an exposed imaging plate. The imaging plate is inserted into the barrier envelope and the peel-strip removed to permit contact between the adhesive flap and cooperating flap and thus sealing of the imaging plate within the barrier envelope.

The "V" notch in a flap of the barrier envelope may have a finite radius at its point due to the manner in which the tooling is constructed, or due to wear of the tooling during manufacture of barrier envelopes. Such a finite radius decreases the ease with which the user can initiate a tear of the barrier envelope. Still further, since the barrier envelopes are constructed of plastic typically with orientation in one direction, the orientation is in a direction orthogonal to the normal direction of tear (as defined by the location of the notch) and therefore render such tearing and subsequent removal of the imaging plate more difficult. Difficulty in tearing makes removal of the imaging plate less controllable and thus requires more care in directing the ejected imaging plate into a receiving receptacle. The partially opaque plastic film is usually dark blue or navy blue in color and are thus of limiting shielding effect.

OBJECTS OF THE INVENTION

An object of the present invention is to provide an improved barrier envelope for an imaging plate which is easier to open.

A further object of the present invention is to provide an improved barrier envelope of improved light blocking capability.

SUMMARY OF THE INVENTION

These and other objects of the present invention are achieved by a barrier envelope for reusable photo-stimulable phosphor imaging plates, particularly for digital dental imaging comprised of a plastic transparent film and a plastic opaque film sealed to each other about three sides thereof defining a chamber for an imaging plate and wherein a free side of each film is formed with a flap and one flap is coated with an adhesive medium protected by a peel strip and wherein a "Y" shaped notch is provided on a side of the barrier envelope adjacent to the free side of each film the barrier envelope to facilitate tearing open of the barrier envelope in a removal procedure and transport of an exposed imaging plate to an optical scanning assembly.

BRIEF DESCRIPTION OF THE DRAWINGS

A better understanding of the present invention, as well as other objects and advantages thereof will become apparent upon a consideration of the detailed disclosure thereof, together with the accompanying drawings wherein like numerals indicate like parts throughout and wherein.

DETAILED DESCRIPTION OF THE DRAWINGS

Figure 2:
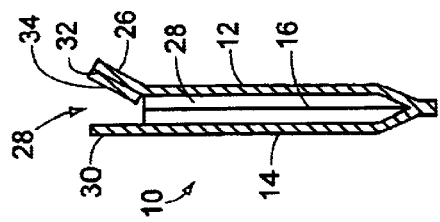
FIG. 2 is an enlarged partial view of "A" of FIG. 1 of the barrier envelope of the present invention.

Referring now to the drawing, there is provided a barrier envelope of the present invention, generally indicated as 10, comprised of a transparent plastic film 12 and an opaque plastic film 14 heat sealed together, illustrated by the dotted line 16 about a left side portion 18, a bottom side portion 20 and a right side portion 22 of the barrier envelope 10 of the present invention thereby defining a chamber 24 within the barrier envelope for an imaging plate, not shown, as more fully hereinafter described.

A top or free end portion 26 of the transparent plastic film 12 defines a slot or opening, generally indicated as 28, into the chamber 24 with a top or free end portion 30 of the opaque plastic film 14. An inner surface 32 of the free end portion 26 of the transparent plastic 12 is provided with an adhesive coating overlaid by a free peel strip 34. In the dental art, the transparent plastic film 12 is commonly referred to as the front side, whereas the opaque plastic film 14 is the rear side. Upon removal of the peel strip 34 from the free end portion 26 of the transparent plastic film 12, the inner surface 32 of the free end portion 34 is caused to contact the free end 30 of the opaque film 14 in a manner to seal the chamber 24 along a line (illustrated by the "dotted" line 36) from the left side portion 18 to the right side portion 22 of the barrier envelope 10.

Each of the plastic films 12 and 14 are in uni-axial orientation in a parallelledly direction to the heat seal 16 of the bottom side 20 thereby causing any tearing of the barrier envelope 10 to be effected along such an orientation. Proximate to and parallelledly disposed to the line 36, there is formed a "Y" shaped notch, generally indicated as 38, in the right side portion 22 of the barrier envelope 10 including an inwardly excised leg section 40, referring particularly to FIG. 2 to facilitate tearing as more fully hereinafter described. The slot 38 is perpendicularly disposed to the line 16 of the right end portion 22 and is displaced from the seal line 36 towards the bottom side portion 20 of the barrier envelope 10.

Figure 1:
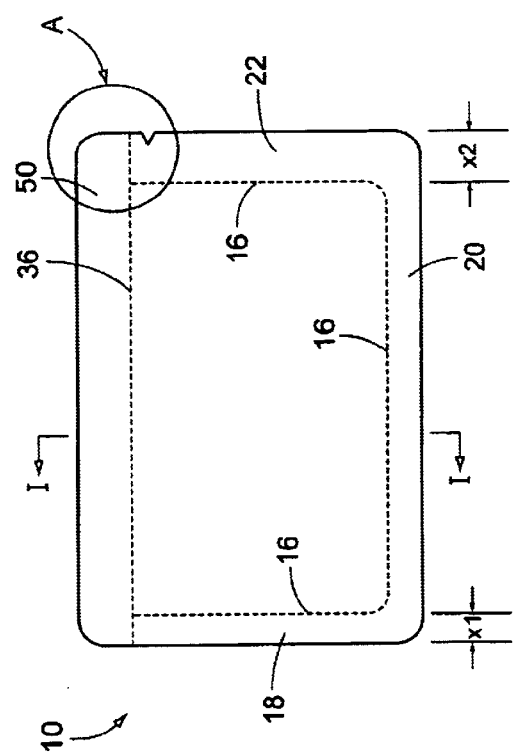
FIG. 1 is a plan view of a barrier envelope of the present invention.
Figure 3:
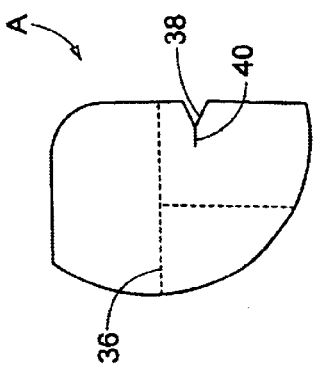
FIG. 3 is an enlarged, somewhat schematic, cross-sectional view of the barrier envelope of the present invention taken along the lines of I—I of FIG. 1.

Referring again to FIG. 1, the linear dimension between the heat seal line 16 of the left side portion 22 to an outer edge thereof, represented by "X1" is greater than a linear dimension between the heat seal line 16 of the right side portion 18 to an outer edge thereof, represented by a "X2" to provide better purchase in effecting tearing during removal of an imaging plate.

The term opaque is used herein in the sense of preventing any transmission of light from a source of active electromagnetic radiation. The front side of the transparent plastic film 12 is provided with an indicia 50 to provide proper orientation to the user in the positioning of a barrier envelope including an imaging film within the oral cavity of the patient.

While the present invention has been described with respect to an exemplary embodiment thereof, it will be understood by one of ordinary skill in the art that many modifications or changes can be achieved without departing from the spirit and scope of the invention. Therefore it is manifestly intended that the invention be limited only by the scope of the claims and the equivalence thereof.

What is claimed:

1. An improved barrier envelope for a reusable imaging plate, which comprises:

a transparent plastic film;

an opaque plastic film heat sealed to said transparent plastic film about a left side portion, a right side portion and a bottom portion thereby defining a chamber for said imaging plate, said films having an axial orientation parallel to a heat sealed seam of said bottom portion, a free side of one of said films provided with an adhesive coating wherein contact between said adhesive coating on said free side of one of said films with a free side of a cooperating film defines a seal line for hermetically sealing said chamber of said barrier envelope and a side portion of said barrier envelope provided with a "Y" shaped notch including an excise portion.

2. The improved barrier envelope as defined in claim 1 wherein said adhesive coating is provided proximate a top of said transparent plastic film.

3. The improved barrier envelope as defined in claim 1 wherein said adhesive coating is overlaid with a peel strip.

4. The improved barrier envelope as defined in claim 1 wherein said "Y"-shaped notch is provided on said right side portion of said barrier envelope.

5. The improved barrier envelope as defined in claim 4 wherein said "Y"-shaped notch is perpendicularly disposed to said heat seal of said right side portion at a point below said seal line.

6. The improved barrier envelope as defined in claim 1 wherein a linear dimension between the heat seal of said right side portion and an edge thereof is greater than a linear dimension between the heat seal of said left side portion and on edge thereof.

7. The improved barrier envelope as defined in claim 5 wherein a linear dimension between the heat seal of said right side portion and an edge thereof is greater than a linear dimension between the heat seal of said left side portion and on edge thereof.

8. The improved barrier envelope as defined in claim 1 wherein said opaque plastic film is impervious to active electromagnetic radiation.

* * * * *